US007195184B2

(12) United States Patent
Yamauchi et al.

(10) Patent No.: US 7,195,184 B2
(45) Date of Patent: Mar. 27, 2007

(54) METHOD OF CRUSHING SILICON BLOCKS

(75) Inventors: Norichika Yamauchi, Ichihara (JP); Takehiko Shimada, Yokohama (JP)

(73) Assignee: IIS Materials Corporation, Ltd., Tokyo (JP)

( * ) Notice: Subject to any disclaimer, the term of this patent is extended or adjusted under 35 U.S.C. 154(b) by 112 days.

(21) Appl. No.: 10/954,350

(22) Filed: Oct. 1, 2004

(65) Prior Publication Data

US 2005/0082400 A1    Apr. 21, 2005

(30) Foreign Application Priority Data

Oct. 1, 2003    (JP) .............................. 2003-377554

(51) Int. Cl.
    *B02C 11/08*    (2006.01)
(52) U.S. Cl. ............................ 241/23; 241/27; 241/262
(58) Field of Classification Search .................. 241/23, 241/27, 262, 263
    See application file for complete search history.

(56) References Cited

U.S. PATENT DOCUMENTS 4,565,913 A * 1/1986 Yatsurugi et al. ............. 264/10
4,871,117 A * 10/1989 Baueregger et al. .......... 241/23

FOREIGN PATENT DOCUMENTS

| JP | 401014109 A | * | 1/1989 |
| JP | 02 152554 | | 6/1990 |
| JP | 10 015422 | | 1/1998 |

* cited by examiner

*Primary Examiner*—Faye Francis
(74) *Attorney, Agent, or Firm*—Michael Tobias

(57) ABSTRACT

In a method of crushing silicon blocks, a silicon block to be crushed is heated and is then forcedly cooled. Subsequently, a crushing member which contains no metal component at least on a surface thereof is made to strike the cooled silicon block to thereby crush the silicon block. Alternatively, two silicon blocks to be crushed are heated and are then forcedly cooled. Subsequently, the cooled silicon blocks are made to strike against each other, whereby the silicon blocks are crushed.

18 Claims, 2 Drawing Sheets

METHOD OF CRUSHING SILICON BLOCKS

BACKGROUND OF THE INVENTION

1. Field of the Invention

The present invention relates to a method of crushing silicon blocks, such as blocks of scrap silicon, without contamination of the silicon. More particularly, the present invention relates to a method of crushing, without contamination, blocks of scrap silicon to a size suitable for refining the scrap silicon.

2. Background Art

Recycling of scraps of silicon (scrap silicon) produced during fabrication of semiconductor silicon has been desired. However, for such recycling, impurities, such as dopants, contained in scrap silicon must be removed so as to increase the purity of the silicon. A vacuum refining technique may be employed for increasing the purity of scrap silicon. In this technique, blocks of scrap silicon must be crushed to a smaller size suitable for refining. This is because blocks of scrap silicon come in various shapes and sizes which are difficult to handle. Therefore, blocks of scrap silicon must be crushed to have generally the same size.

Since silicon blocks are very hard, conventionally, silicon blocks are crushed by use of a so-called jaw crusher, which is an ore crusher. At the time of crushing with a jaw crusher, a metal surface of a structural member of the crusher comes into contact with a silicon block, and a metal component from the metal surface adheres to the crushed silicon block. Such adhesion or mixing of metal impurities caused by frictional engagement between the silicon blocks and the structural member cannot be avoided so long as the conventional technique is employed, in which a hard silicon block is crushed through application of a large mechanical force sufficient to crush the block. In the conventional technique, pieces of silicon obtained by crushing of silicon blocks are treated with acid so as to resolve and remove metal impurities adhering to the silicon pieces. However, such metal impurities cannot be completely removed. Accordingly, in order to obtain silicon of high purity, in addition to a vacuum refining process for removing dopants from scrap silicon, another refining process must be performed in order to remove metal impurities adhering to or mixed with pieces of silicon. Therefore, recycling of scrap silicon has been very expensive.

SUMMARY OF THE INVENTION

In view of the foregoing, the present invention provides a method of crushing blocks of silicon to a desired size, without contaminating the silicon with metal impurities.

A method of crushing silicon blocks according to one form of the present invention comprises heating a silicon block to be crushed, forcedly cooling the heated silicon block, and applying a force to the cooled silicon block to thereby crush the silicon block.

Preferably, applying a force comprises causing a crushing member which contains no metal component at least on a surface thereof to strike the cooled silicon block with its surface to thereby crush the silicon block. The crushing member may comprise a silicon block having substantially the same composition as the silicon block to be crushed, a block of pure silicon containing substantially no impurities, a crushing tool having a surface lined with a layer of silicon having substantially the same composition as the silicon block to be crushed or pure silicon containing substantially no impurities, or a crushing tool having a surface coated with a resin.

A method of crushing silicon blocks according to another form of the present invention comprises heating at least two silicon blocks to be crushed, forcedly cooling the heated silicon blocks, and causing the cooled silicon blocks to strike each other so as to crush the silicon blocks.

The heating may be performed by radio-frequency heating, gas burner heating, electrical resistance heating, or infrared heating, for example.

In the heating, the silicon block(s) are preferably heated to at least 300° C., and more preferably to a temperature within the range of 600° C. to 1,000° C.

The forced cooling is preferably performed by immersing the silicon block(s) in a cooling medium. Examples of the cooling medium include water, oil, and liquefied gas. The cooling medium may contain an agent for cleaning the surface of the silicon block(s).

In a method of crushing silicon blocks according to the present invention, before crushing, a silicon block is heated and cooled so that the silicon block becomes brittle. Therefore, the silicon block can be easily crushed with a small force by causing another silicon block or the above-mentioned crushing member to strike the cooled silicon block. Therefore, silicon blocks can be crushed to a size suitable for refining either manually or by use of a simple machine. Moreover, since a crushing tool which has a metallic surface and causes mixing of metal impurities is not used, silicon grains obtained by crushing are not contaminated with metal impurities. Therefore, a vacuum refining process, which has conventionally been required for removing metal components, becomes unnecessary, and the cost of recycling scrap silicon can be greatly lowered.

BRIEF DESCRIPTION OF THE DRAWINGS

Various other features and attendant advantages of the present invention will be readily appreciated as the same becomes better understood by reference to the following detailed description of a preferred embodiment when considered in connection with the accompanying drawings, in which.

DESCRIPTION OF PREFERRED EMBODIMENTS

Figure 1:
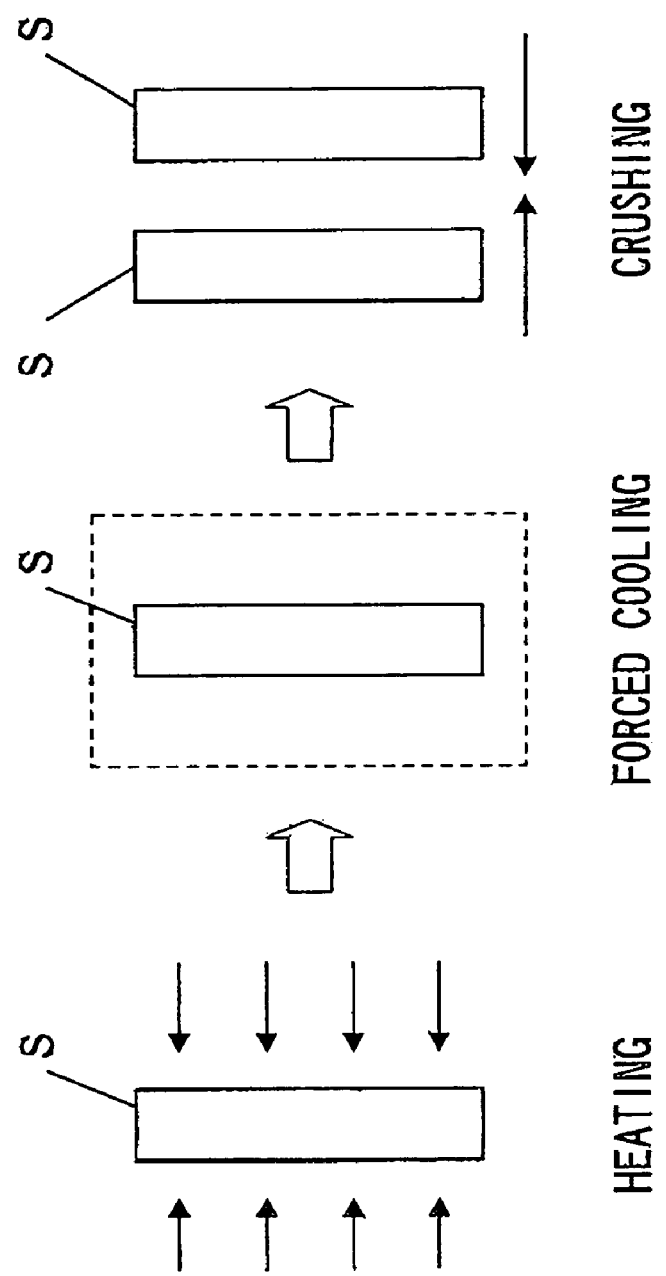
FIG. 1 is a diagram schematically showing the steps in an embodiment of a method of crushing silicon blocks according to the present invention.

A method of crushing silicon blocks according to the present invention can be practiced in at least two modes. In the first mode, two silicon blocks are heated and cooled so that the silicon blocks become brittle, and they are then made to strike against each other. In the second mode, a single silicon block is heated and cooled so that the silicon block becomes brittle, and then a crushing member which contains no metal component on at least a surface thereof is made to strike the cooled silicon block.

Examples of objects which can be used as the crushing member in the second mode include a silicon block having substantially the same composition as the silicon block to be crushed, a crushing tool having a surface lined with a layer of silicon having substantially the same composition as the silicon block to be crushed, and a crushing tool having a surface coated with a resin. When a crushing tool having a surface coated with a resin is used, silicon grains produced as a result of crushing may contain carbon. Therefore, a silicon block having the same composition as the silicon block to be crushed or a crushing tool having a surface lined with a layer of silicon having the same composition as the silicon block to be crushed is preferably used as a crushing member. The expression "silicon having the same composition" refers to silicon which contains the same dopants as does a silicon block to be crushed.

The heating in the heating step can be performed by radio-frequency heating, gas burner heating, electrical resistance heating, and infrared heating, for example. However, since electrical resistance heating and infrared heating have a low heating efficiency, radio-frequency heating or gas burner heating is preferred. Use of radio-frequency heating is most preferable, because radio-frequency heating enables uniform heating of a silicon block within a short period of time, without contamination.

When a silicon block is heated by radio-frequency heating, the silicon block is placed into a crucible formed of high-purity quartz and surrounded by an annular ring of high-purity graphite, and the graphite ring is heated by radio waves. Thus, the silicon block placed into the crucible is heated by radiant heat from the graphite ring. During such heating, the resistance of the semiconductor silicon block decreases, and thus, the silicon block becomes conductive. Therefore, from the middle of the heating process, the silicon block is heated directly by radio waves. Conventionally, radio-frequency heating of silicon, which is a semiconductor, has been considered impossible. However, through experiments, the present inventors have found that silicon blocks can be heated directly by radio waves. It is thought that this phenomenon occurs because silicon blocks are blocks of scrap silicon containing doped impurities and therefore have some degree of conductivity.

Through experiments, the inventors have confirmed that when a silicon block is heated at 300° C. or higher for about 2 minutes to about 5 minutes, the silicon block can be crushed to a desired size after forced cooling thereof. When the heating temperature is lower than 300° C. or the heating time is less than 2 minutes, crushing of the silicon block after forced cooling cannot be performed properly. Moreover, the present inventors have found that when a silicon block is heated to 600° C. or higher, breakage of the silicon block proceeds quickly, and the size of resultant silicon grains decreases greatly. When the size of resultant silicon grains decreases, handling and refining of silicon in subsequent processes become easier. Therefore, a silicon block is preferably heated to 600° C. or higher. Heating a silicon block to a temperature higher than 1,000° C. is not preferable from the viewpoint of mixing and dispersion of impurities such as metals, as well as from the viewpoint of the cost of energy consumed by heating. Accordingly, the temperature range of 600° C. to 1,000° C. is preferable.

When a heated silicon block is naturally cooled in air, no cracks are generated in the silicon block. Furthermore, when a silicon block is not heated sufficiently in the heating step, no cracks are generated in the silicon block. Cracks are generated in a silicon block only when the silicon block is heated to 300° C. or higher and then placed into water at room temperature in a tank, for example. Cracks may conceivably be generated in a silicon block when a jet of cold air is blown at the silicon block to thereby rapidly cool the silicon block.

When water is used as a cooling medium, an agent for increasing the specific heat of water may be added to the water. Additionally or alternatively, a surfactant may be added to the water so as to remove dirt from the surface of a silicon block while cooling the silicon block. Alternatively, oil having a boiling point higher than water may be used as a cooling medium. Use of oil enables a silicon block to be cooled to a temperature higher than the boiling point of water, such as about 200° C. Alternatively, a solution of acid, such as nitric acid, may be used as a cooling medium. In this case, the acid solution dissolves and removes heavy metals from the surface of a silicon block while cooling the silicon block. A liquefied gas such as liquid nitrogen may also be used as a cooling medium. Since a liquefied gas has a very low temperature, it is very effective for crushing of silicon. Furthermore, use of liquefied gas eliminates the necessity of waste liquid treatment. A freon substitute, which is generally used for the purpose of silicon cleaning in semiconductor plants, may be used as a cooling medium.

In the mode in which a single silicon block is heated and cooled so that the silicon block becomes brittle and then a crushing member which contains no metal component at least on a surface thereof is made to strike the cooled silicon block, the crushing member may be pressed against the silicon block by press working, roll working, or dropping the crushing member onto the silicon block.

EXAMPLE 1

FIG. 1 schematically illustrates an embodiment of a method of crushing silicon blocks. The method includes three steps, i.e., a heating step, a cooling step, and a crushing step.

In the heating step, by use of an unillustrated gas burner, a silicon block (a block of scrap silicon) S is heated to a temperature of 500° C. to 1,000° C. for about two to five minutes. The heating of the silicon block S is performed on silicon oxide, a refractory brick containing no metal component, a silicon plate having the same composition as the silicon block S, or a plate of pure silicon containing no impurity, whereby adhesion of metal impurities to the silicon block S is prevented.

In the cooling step, the silicon block S is placed into water (at room temperature) contained in a tank so as to rapidly cool the silicon block S. As a result, cracks are generated in the silicon block S, whereby the silicon block S becomes brittle.

In the crushing step, two silicon blocks S which have undergone heating and cooling are made to strike against each other to thereby crush both the silicon blocks simultaneously. When this crushing operation is performed manually, a worker holds one of the heat-treated silicon blocks in each of his hands above a tray formed of a plastic such as polyethylene and strikes the silicon blocks S against each other to thereby crush the silicon blocks S. The resulting grains of silicon are collected in the tray. Since the tray is formed of a plastic, no metal impurity adheres to the grains of silicon.

EXAMPLE 2

In Example 1, silicon blocks are made to strike against each other to crush the silicon blocks. In contrast, in Example 2 shown in FIG. 2, a silicon block S is crushed by use of a crushing member (crushing tool) lined with silicon.

Figure 2:
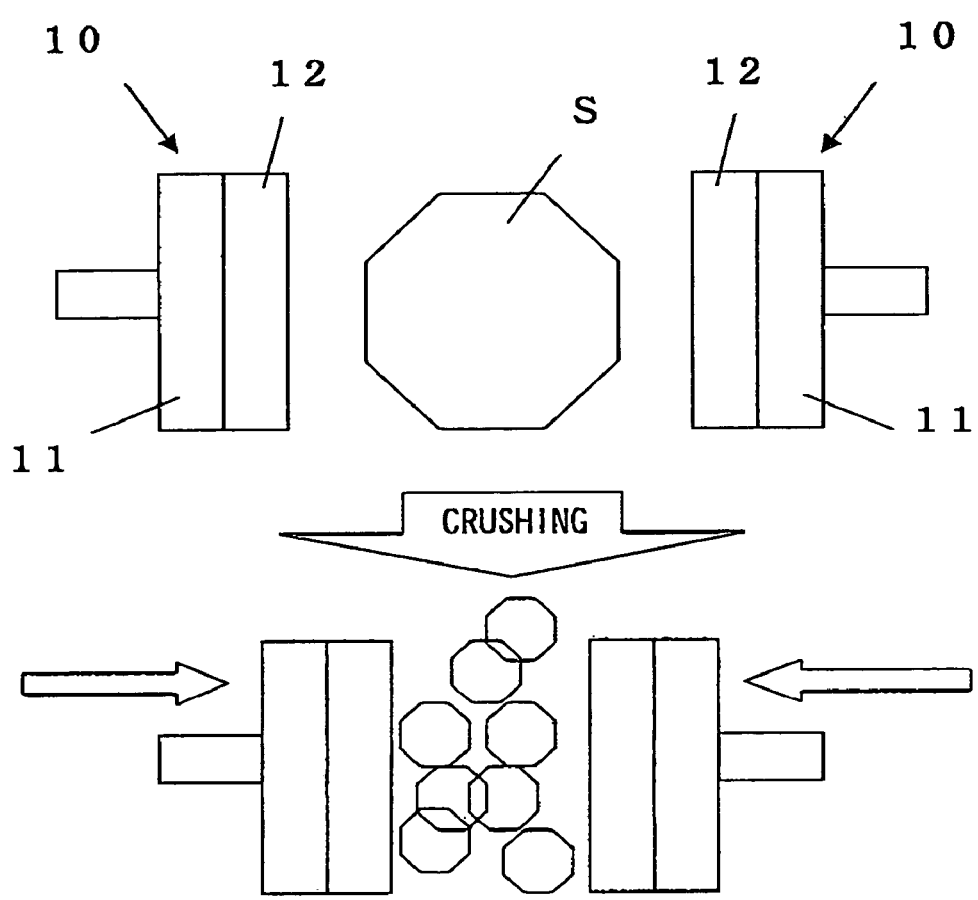
FIG. 2 is a diagram schematically showing a modification of the crushing step.

In FIG. 2, reference numeral 10 denotes a pair of crushing tools. Each of the crushing tools comprises a base member 11 formed of metal such as iron, and a silicon lining 12 attached to a selected surface of the base member 11 and serving as a crushing face. The silicon lining 12 is a plate formed from scrap silicon which has not undergone the heating and cooling steps, or a high-purity silicon ingot prepared separately from the silicon block S. A silicon block S is first heated and cooled in the same manner as in Example 1 and is then placed onto a plastic tray (not shown), for example. Subsequently, the paired crushing tools 10 are struck or pressed against the silicon block S from opposite sides thereof. As a result, the silicon block S is crushed to a desired size.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of crushing scrap silicon blocks, comprising:
   heating a first block of doped scrap silicon to be crushed;
   forcedly cooling the heated first silicon block; and
   applying a force to the cooled first silicon block with a crushing member to crush the first silicon block.

2. A method of crushing scrap silicon blocks as claimed in claim 1, wherein the crushing member comprises a crushing tool having a surface of doped scrap silicon.

3. A method of crushing scrap silicon blocks as claimed in claim 1, wherein the crushing member comprises a second block of doped scrap silicon having substantially the same composition as the first silicon block.

4. A method of crushing scrap silicon blocks as claimed in claim 3 including manually striking the first and second silicon blocks against each other after forcedly cooling the first silicon block to crush the first silicon block.

5. A method of crushing scrap silicon blocks as claimed in claim 4 wherein manually striking comprises a worker holding one of the cooled silicon blocks in each hand and manually striking the blocks against each other.

6. A method of crushing scrap silicon blocks as claimed in claim 2, wherein the surface of doped scrap silicon of the crushing tool comprises a lining of silicon having substantially the same composition as the first silicon block.

7. A method of crushing scrap silicon blocks as claimed in claim 1, wherein the crushing member comprises a crushing tool having a surface coated with a resin.

8. A method of crushing scrap silicon blocks as claimed in claim 1, wherein heating the first silicon block comprises radio-frequency heating, gas burner heating, electrical resistance heating, or infrared heating.

9. A method of crushing scrap silicon blocks as claimed in claim 1, wherein heating the first silicon block comprises heating the first silicon block to at least 300° C.

10. A method of crushing scrap silicon blocks as claimed in claim 9, wherein heating the first silicon block comprises heating the first silicon block to a temperature within the range of 600° C. to 1,000° C.

11. A method of crushing scrap silicon blocks as claimed in claim 1, wherein forcedly cooling the first silicon block comprises immersing the first silicon block in a cooling medium.

12. A method of crushing scrap silicon blocks as claimed in claim 11, wherein the cooling medium comprises liquefied gas.

13. A method of crushing scrap silicon blocks as claimed in claim 11, wherein the cooling medium contains an agent for cleaning a surface of the first silicon block.

14. A method of crushing scrap silicon blocks as claimed in claim 13 wherein the agent for cleaning comprises a surfactant.

15. A method of crushing scrap silicon blocks as claimed in claim 11 wherein the cooling medium comprises water and an agent for increasing the specific heat of the water.

16. A method of crushing scrap silicon blocks as claimed in claim 11 wherein the cooling medium comprises oil.

17. A method of crushing scrap silicon blocks as claimed in claim 11 wherein the cooling medium comprises an acid.

18. A method of crushing scrap silicon blocks as claimed in claim 17 wherein the cooling medium comprises nitric acid.

* * * * *